United States Patent
Kuravangi-Thammaiah et al.

(10) Patent No.: US 11,729,223 B1
(45) Date of Patent: Aug. 15, 2023

(54) SYSTEMS AND METHODS FOR FACILITATING PROVISIONING OF INTERNET PROTOCOL MULTIMEDIA SUBSYSTEM SERVICES

(71) Applicant: Verizon Patent and Licensing Inc., Basking Ridge, NJ (US)

(72) Inventors: Shanthala Kuravangi-Thammaiah, Keller, TX (US); Lalit R. Kotecha, San Ramon, CA (US); Shweta Sinha, Tampa, FL (US); Ce Xu, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/660,782

(22) Filed: Apr. 26, 2022

(51) Int. Cl.
　*G06F 13/00*　　(2006.01)
　*H04L 65/1016*　(2022.01)
　*H04L 65/1069*　(2022.01)
　*H04L 65/1063*　(2022.01)
　*H04L 65/1073*　(2022.01)

(52) U.S. Cl.
　CPC ...... *H04L 65/1016* (2013.01); *H04L 65/1063* (2013.01); *H04L 65/1069* (2013.01); *H04L 65/1073* (2013.01)

(58) Field of Classification Search
　CPC ............ H04L 65/1016; H04L 65/1063; H04L 65/1069; H04L 65/1073
　USPC .................. 709/204–206, 227–229, 230
　See application file for complete search history.

(56) References Cited

U.S. PATENT DOCUMENTS

| | | | | |
|---|---|---|---|---|
| 11,310,845 | B2* | 4/2022 | Wong | H04W 76/10 |
| 11,395,127 | B2* | 7/2022 | Sahin | H04L 65/1069 |
| 2021/0329716 | A1* | 10/2021 | Wong | H04L 65/1016 |
| 2022/0070649 | A1* | 3/2022 | Sahin | H04L 65/1073 |
| 2022/0131910 | A1* | 4/2022 | Baskaran | H04L 65/1073 |

* cited by examiner

*Primary Examiner* — Kenneth R Coulter (57) ABSTRACT

In some implementations, a network device (e.g., an Internet protocol multimedia subsystem (IMS) application server (IMS-AS) may receive, via a first communication interface, from a call session control function (CSCF) device, a request to register for an Internet protocol multimedia subsystem (IMS) service. The network device may provide via a second communication interface between the network device and a unified data management (UDM) device, and to the UDM device, a request for IMS service information associated with the IMS service. The network device may receive based on providing the request for IMS service information, via the second communication interface, and from the UDM device, IMS service information. The network device may cause, based on the IMS service information, the IMS service to be provided to a user device associated with the request to register for the IMS service.

20 Claims, 8 Drawing Sheets

SYSTEMS AND METHODS FOR FACILITATING PROVISIONING OF INTERNET PROTOCOL MULTIMEDIA SUBSYSTEM SERVICES

BACKGROUND

A user device may access Internet protocol (IP) multimedia subsystem (IMS) services via a core network.

DETAILED DESCRIPTION OF EXAMPLE EMBODIMENTS

The following detailed description of example implementations refers to the accompanying drawings. The same reference numbers in different drawings may identify the same or similar elements.

A home subscriber server (HSS) of a fourth-generation (4G) network may enable a user device (e.g., a mobile terminal or a user equipment (UE)) to access IMS services. When a user device requests an IMS service (e.g., a voice-over-IP (VoIP) service, an IMS messaging service, and/or the like), an IMS application server (IMS-AS) obtains information from the HSS in order to provide the IMS service to the user device. In a fifth-generation (5G) network, the IMS-AS may communicate with a unified data management (UDM) device, via an HSS, to obtain the information in order to provide the IMS service to the user device. Current techniques may co-locate the HSS with the UDM or integrate the HSS within the UDM. However, such arrangements still require the IMS-AS to query the HSS in order to reach the UDM and obtain information for providing the IMS service to the user device. Moreover, an HSS configured for a 4G network does not support service-based interfaces, thus, a network provider may be required to provide and maintain a first type of HSS for a 4G network and a second type of HSS for a 5G network.

Consequently, current techniques for an IMS-AS to provide the IMS service to the user device consume computing resources (e.g., processing resources, memory resources, communication resources, and/or power resources, among other examples), networking resources, and/or other resources associated with providing and maintaining two types of HSSs for a 4G network and a 5G network, causing additional communications between the HSS and the UDM device to enable the IMS-As to communicate with the UDM device, and/or the like.

Some implementations described herein provide a network device (e.g., an IMS-AS device) that facilitates provisioning of IMS services. For example, the IMS-AS device establishes a communication interface with a UDM device. The IMS-AS device may receive, via another communication interface and from a call session control function (CSCF) device, a request to register for an IMS service. Accordingly, the IMS-AS device may provide, via the communication interface and to the UDM device, a request for IMS service information associated with the IMS service. The IMS-AS device may receive, based on providing the request for IMS service information, via the communication interface, and from the UDM device, the IMS service information (e.g., that includes registration data associated with the IMS service, location data associated with the IMS service, authentication data associated with the IMS service, and/or subscriber profile data associated with the IMS service). The IMS-AS device may thereby cause, based on the IMS service information, the IMS service to be provided to a user device associated with the request to register for the IMS service In this way, the IMS-AS device facilitates provisioning of the IMS services. For example, the IMS-AS device and the UDM device may each be enhanced to support a communication interface (e.g., a service-based interface) between the IMS-AS and the UDM device. The communication interface may be utilized to provide (e.g., directly provide) the IMS service information to the IMS-AS device. The IMS-AS device may utilize IMS service information to facilitate provisioning of the IMS service to the user device. Thus, the IMS-AS device and the UDM device may conserve computing resources, networking resources, and/or other resources that would have otherwise been consumed by providing and maintaining two types of HSSs for a 4G network and a 5G network, causing additional communications between the HSS and the UDM device to enable the IMS-AS to communicate with the UDM device, and/or the like.

FIGS. 1A-1E are diagrams of an example 100 associated with facilitating provisioning of IMS services. As shown in FIGS. 1A-1E, example 100 includes a user device (UD) 105, a radio access network (RAN) 110, and a core network 115 (e.g., a 5G core network). The core network 115 may include a session management function (SMF)/user plane function (UPF), a P/I/S-CSCF (e.g., a proxy CSCF or P-CSCF, an interrogating CSCF or I-CSCF, and a serving CSCF or S-CSCF), a UDM device 120 (also referred to as the UDM 120), a unified data repository (UDR), and a network resource function (NRF) device 125 (also referred to as the NRF 125). As further shown in FIGS. 1A-1E, example 100 further includes an IMS network 130, which may include an IMS-AS device 135 (also referred to as the IMS-AS 135). Further details of the user device 105, the RAN 110, the core network 115, the SMF/UPF, the P/I/S-CSCF, the UDM 120, the UDR, the NRF 125, and the IMS-AS 135, are provided elsewhere herein.

Figure 1A:
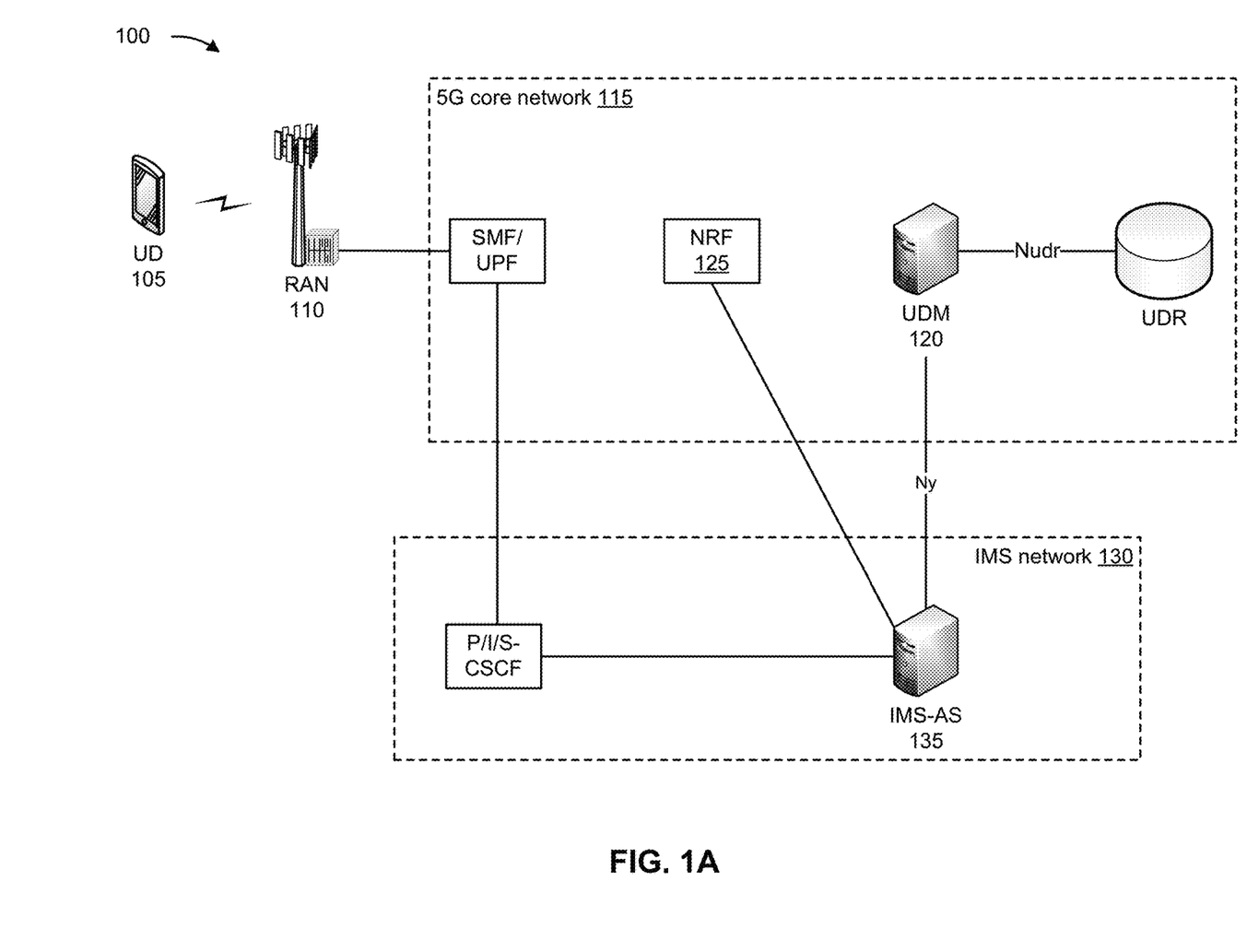
FIGS. 1A-1E are diagrams of an example associated with facilitating provisioning of IMS services.

As shown in FIG. 1A, the user device 105 may communicate with the core network 115 via the RAN 110. The IMS-AS 135 may communicate with the P/I/S-CSCF and the NRF 125 via communication interfaces. As further shown in FIG. 1A, a new communication interface Ny (e.g., a service-based interface or SBI) may be established between IMS-AS 135 and the UDM 120 (e.g., that directly connects the IMS-AS 135 and the UDM 120) to enable the IMS-AS 135 to communicate (e.g., directly communicate) with the UDM 120. The UDM 120 and the IMS-AS 135 may be enhanced to establish and support the SBI Ny interface, and may utilize the SBI Ny to communicate one or more messages related to IMS service information, as described below in connection with FIGS. 1B-1E. As further shown in FIG. 1A, the UDM 120 may communicate with the UDR via a communication interface Nudr. The UDR (also referred to as a UDR device) may include a data structure (e.g., a database, a table, a list, and/or the like) that stores the subscriber information.

Figure 1B:
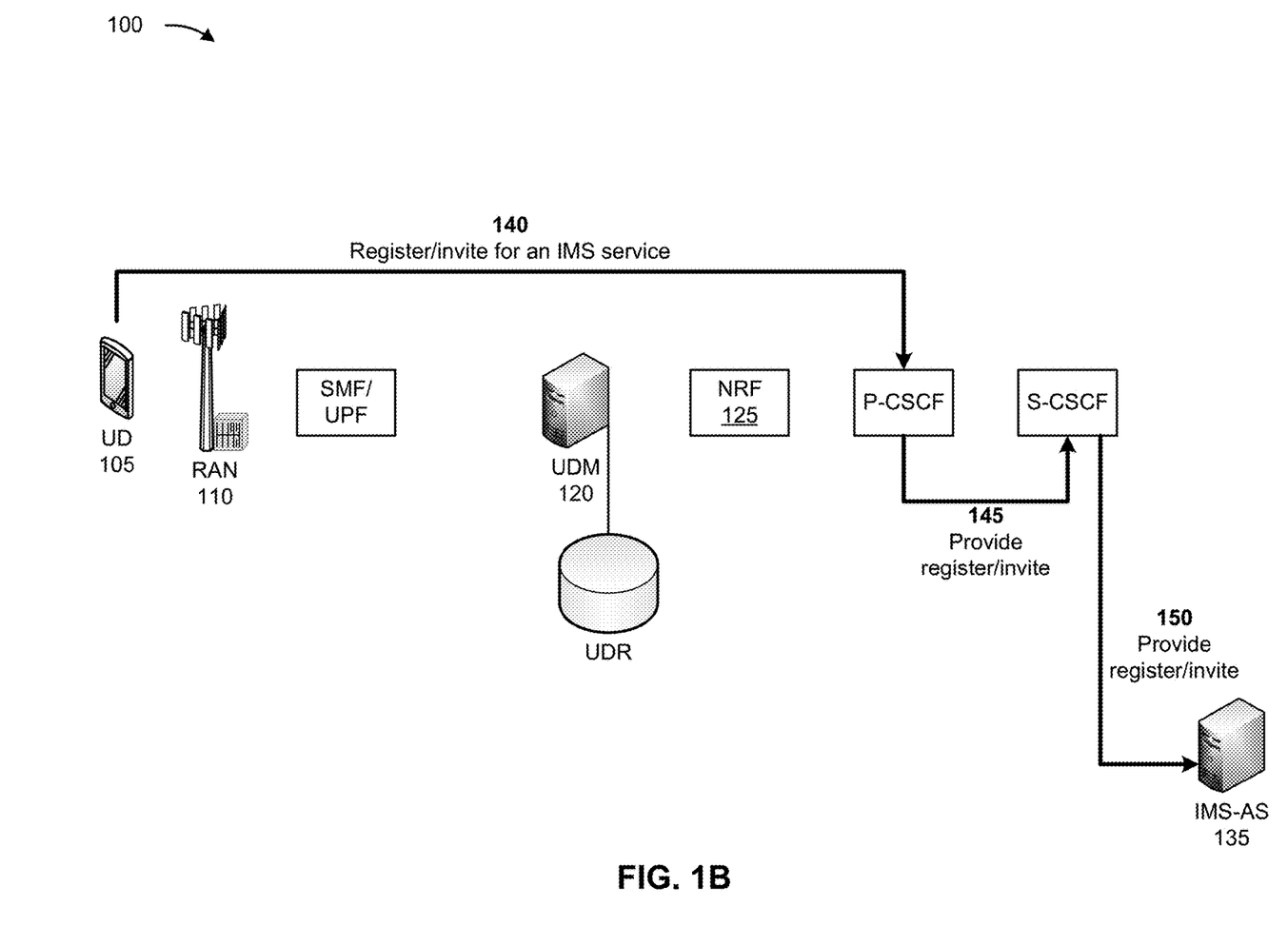

As shown in FIG. 1B, and by reference number 140, the P-CSCF may receive, from the user device 105, a request (e.g., an invite request) to register for an IMS service, such as an IMS voice service (e.g., a VoIP service, such as a voice over new radio (VoNR) service), an IMS video service (e.g., a video over new radio (ViNR) service), or an IMS messaging service (e.g., a rich communication services (RCS) service). For example, the user device 105 may execute an IMS messaging application and the IMS messaging application may generate a request to register an IMS messaging service. The request to register may include registration information associated with the user device 105, such an international mobile subscriber identity (IMSI) of the user device 105, a mobile station international subscriber directory number (MSISDN of the user device 105, an international mobile equipment identity (IMEI) of the user device 105, a subscription permanent identifier (SUPI) of the user device 105, a generic public subscription identifier (GPSI) of the user device 105, and/or a permanent equipment identifier (PEI) of the user device. The user device 105 may provide the request to register for the IMS messaging service to the P-CSCF via the RAN 110. The P-CSCF may receive the request to register from the RAN 110. The P-CSCF may include a session initiation protocol (SIP) proxy that is a first point of contact for the user device 105 in the core network 115. All SIP traffic to and from the user device 105 may travel through the P-CSCF.

As further shown in FIG. 1B, and by reference number 145, the P-CSCF may provide the request to register for the IMS service to the S-CSCF. The S-CSCF may enable requests to be routed to a correct IMS-AS associated with the IMS service, since there may be more than one IMS-AS within the IMS network 130. Accordingly, as shown by reference number 150, the S-CSCF may provide the request to register to the IMS-AS 135 (e.g., that is configured to provide, or to facilitate provision of, the IMS service to the user device 105). For example, the S-CSCF may provide, via a communication interface between the S-CSCF and the IMS-AS 135, the request to register (e.g., that includes the registration information) to the IMS-AS 135, and the IMS-AS 135 may receive the request to register.

Figure 1C:
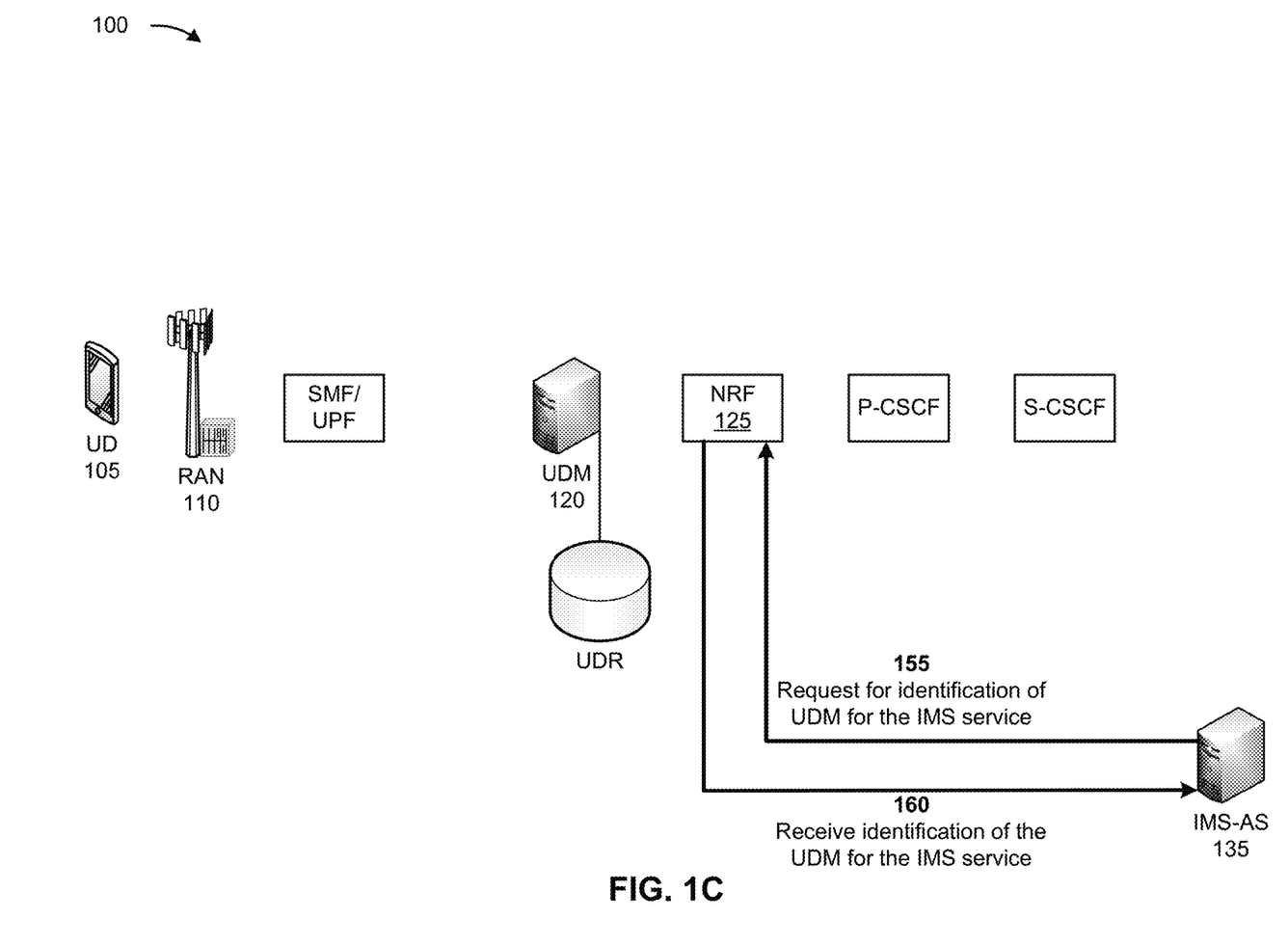

As shown in FIG. 1C, and by reference number 155, the IMS-AS 135 may provide, to the NRF 125, a request for identification of a UDM for the IMS service. For example, the IMS-AS 135 may generate the request for identification of the UDM for the IMS service based on receiving the request to register. In some implementations, the request for identification may include a request for identification of a network function (e.g., the UDM 120) that can facilitate provisioning of the IMS service to the user device 105. The request for identification may include at least some of the registration information (e.g., at least one of the IMSI of the user device 105, the MSISDN of the user device 105, the IMEI of the user device 105, the SUPI of the user device 105, or the GPSI of the user device 105). The IMS-AS 135 may provide the request for identification to the NRF 125 (e.g., via a communication interface between the IMS-AS 135 and the NRF 125), and the NRF 125 may receive the request for identification.

As further shown in FIG. 1C, and by reference number 160, the IMS-AS 135 may receive, from the NRF 125, the identification of the UDM 120 for the IMS service. For example, the NRF 125 may determine the identification of the UDM 120 based on the request for identification. The NRF 125 may identify the UDM 120 since the UDM 120 may be associated with the user device 105 and/or the IMS service requested by the user device 105. The NRF 125 may provide the identification of the UDM 120 to the IMS-AS 135 (e.g., via the communication interface between the IMS-AS 135 and the NRF 125) and the IMS-AS 135 may receive the identification of the UDM 120 for the IMS service.

Figure 1D:
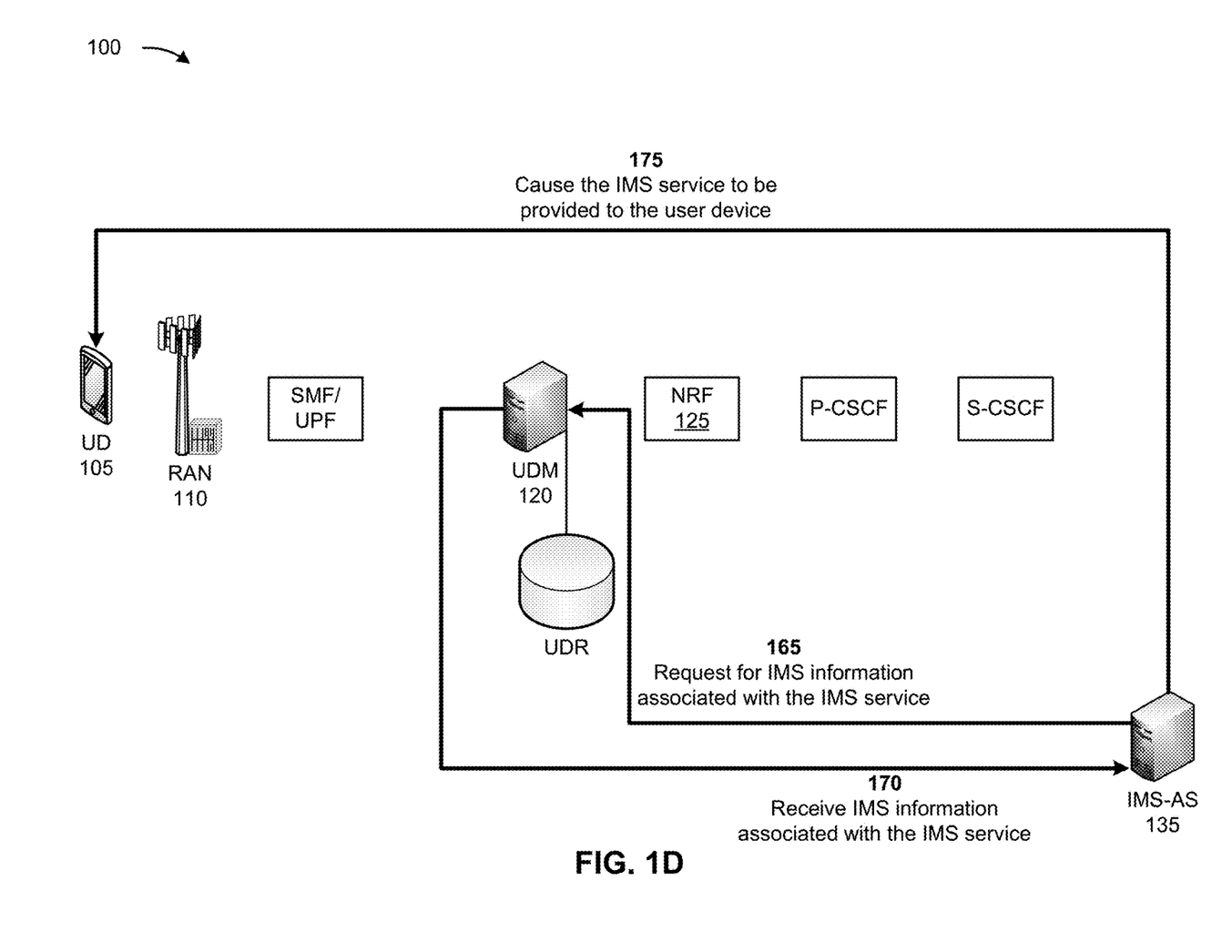

As shown in FIG. 1D, and by reference number 165, the IMS-AS 135 may provide, to the UDM 120, a request for IMS service information associated with the IMS service. The IMS-AS 135 may generate the request for IMS service information based on receiving the request to register for the IMS service from the S-CSCF. The request for IMS service information may include at least some of the registration information (e.g., at least one of the IMSI of the user device 105, the MSISDN of the user device 105, the IMEI of the user device 105, the SUPI of the user device 105, or the GPSI of the user device 105). The IMS-AS 135 may provide the request for IMS service information to the UDM 120 (e.g., via the communication interface Ny between the IMS-AS 135 and the UDM 120), and the UDM 120 may receive the request for IMS service information.

As further shown in FIG. 1D, and by reference number 170, the IMS-AS 135 may receive, from the UDM 120, IMS service information associated with the IMS service based on the request for IMS service information. For example, the UDR may store the IMS service information associated with the IMS service. The UDM 120 may retrieve, based on the request for IMS service information and from the UDR, the IMS service information associated with the IMS service. The UDM 120 may provide the IMS service information retrieved from the UDR to the IMS-AS 135 (e.g., via the communication interface Ny between the IMS-AS 135 and the UDM 120), and the IMS-AS 135 may receive the IMS service information.

The IMS service information may include, for example, registration data associated with the IMS service, location data associated with the IMS service, authentication data associated with the IMS service, and/or subscriber profile data associated with the IMS service. The registration data may include data identifying, for example, users (e.g., associated with user devices 105) that are registered to utilize the IMS service, and/or user devices 105 that are registered to utilize the IMS service. The location data may include data identifying, for example, locations of user devices 105 that are registered to utilize the IMS service and/or a location of the IMS service. The authentication data may include data identifying, for example, authentication credentials of users of user devices 105 that are registered to utilize the IMS service and/or authentication credentials of the IMS service. The subscriber profile data associated with the IMS service may include data identifying, for example, subscriber profiles of users of user devices 105 that are registered to utilize the IMS service.

As further shown in FIG. 1D, and by reference number 175, the IMS-AS 135 may cause the IMS service to be provided to the user device 105 (e.g., based on the IMS service information). For example, the IMS-AS 135 may determine, based on the registration data associated with the IMS service, the location data associated with the IMS service, the authentication data associated with the IMS service, and/or the subscriber profile data associated with the IMS service that is included in the IMS service information, that the user device 105 is to receive the IMS service and that the IMS-AS 135 is capable of providing, or facilitating provisioning of, the IMS service. Accordingly, the IMS-AS 135 may provide, or may facilitate provisioning of, the IMS service to the user device 105.

Figure 1E:
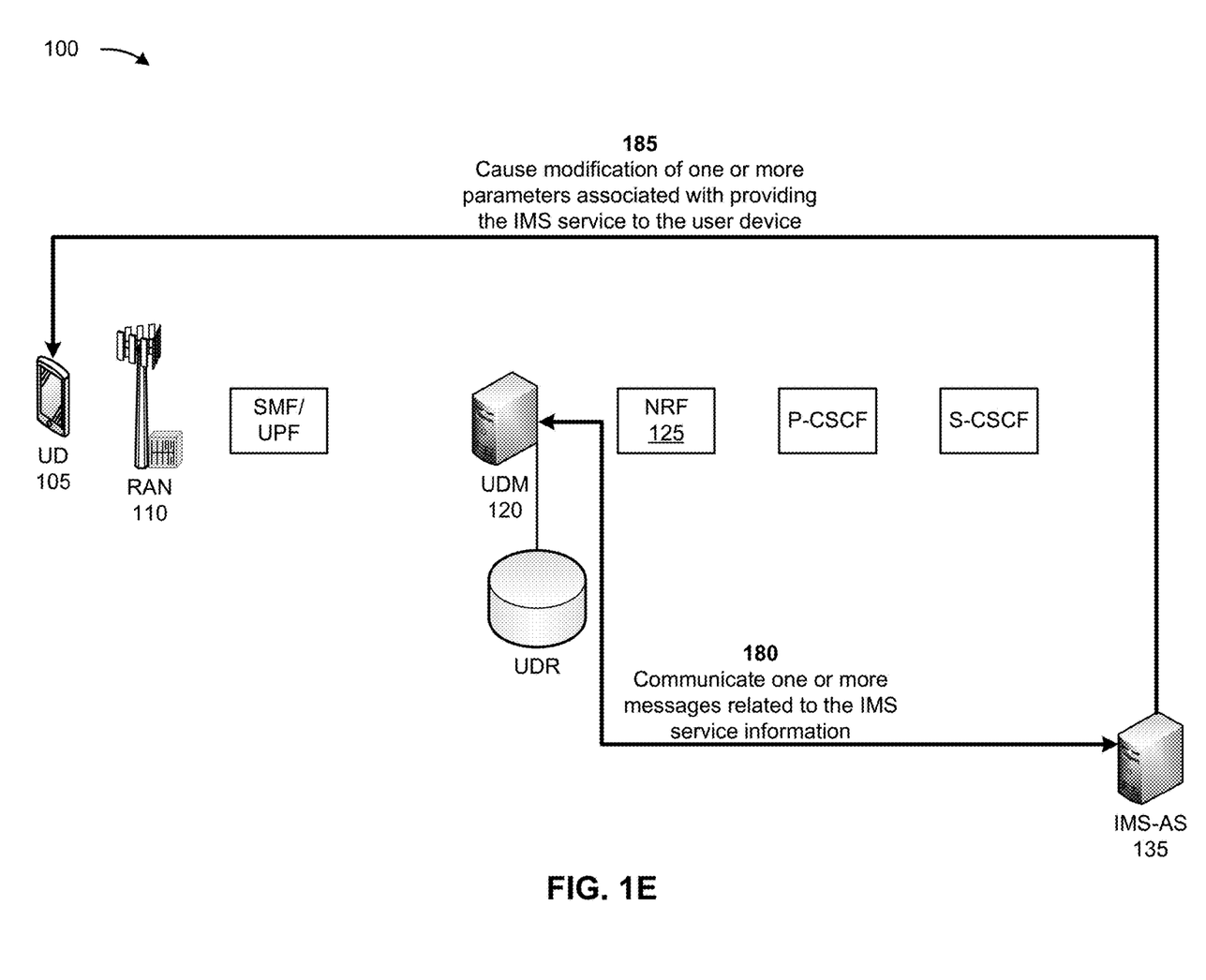

As shown in FIG. 1E, and by reference number 180, the IMS-AS 135 and the UDM 120 may communicate one or more messages related to the IMS service information (e.g., based on the IMS-AS 135 causing the IMS service to be provided to the user device 105).

In an example, the IMS-AS 135 may provide, to the UDM 120, a request to subscribe to IMS session information updates. The IMS-AS 135 may generate the request to subscribe to IMS session information updates based on the IMS-AS 135 causing the IMS service to be provided to the user device. The IMS-AS 135 may provide the request to subscribe to IMS session information updates to the UDM 120 (e.g., via the communication interface Ny between the IMS-AS 135 and the UDM 120), and the UDM 120 may receive the request to subscribe to IMS session information updates. The request to subscribe to IMS session information updates may specify one or more parameters of the IMS session information to monitor for updates and/or a reporting frequency for providing updates to the IMS-AS 135 (e.g., upon detection of an update to the one or more parameters or at a particular time interval after detection of the update).

Accordingly, the UDM 120 may monitor, based on the request to subscribe to IMS session information updates, the UDR for one or more changes to the one or more parameters of the IMS service information. After detecting the one or more changes, the UDM 120 may provide (e.g., based on the reporting frequency indicated by the request to subscribe to IMS session information updates) updated IMS service information retrieved from the UDR to the IMS-AS 135 (e.g., via the communication interface Ny between the IMS-AS 135 and the UDM 120), and the IMS-AS 135 may receive the updated IMS service information.

As another example, the IMS-AS 135 may provide, to the UDM 120, a request to modify a subscription to IMS session information updates. The IMS-AS 135 may generate the request to modify a subscription to IMS session information updates after sending the request to subscribe to IMS session information updates. The IMS-AS 135 may provide the request to modify a subscription to IMS session information updates to the UDM 120 (e.g., via the communication interface Ny between the IMS-AS 135 and the UDM 120), and the UDM 120 may receive the request to modify a subscription to IMS session information updates. The request to modify a subscription to IMS session information updates may indicate one or more parameters (e.g., that are at least partially different than the one or more parameters indicated by the request to subscribe to IMS session information updates) of the IMS session information to monitor for updates and/or a reporting frequency for providing updates to the IMS-AS 135 (e.g., that is different than the reporting frequency indicated by the request to subscribe to IMS session information updates).

Accordingly, the UDM 120 may monitor, based on the request to modify a subscription to IMS session information updates, the UDR for one or more changes to the one or more parameters of the IMS service information. After detecting the one or more changes, the UDM 120 may provide (e.g., based on the reporting frequency indicated by the request to modify a subscription to IMS session information updates) additional updated IMS service information retrieved from the UDR to the IMS-AS 135 (e.g., via the communication interface Ny between the IMS-AS 135 and the UDM 120), and the IMS-AS 135 may receive the updated IMS service information.

As an additional example, the IMS-AS 135 may provide, to the UDM 120, a request to cancel a subscription to IMS session information updates. The IMS-AS 135 may generate the request to cancel a subscription to IMS session information updates after sending the request to subscribe to IMS session information updates. The IMS-AS 135 may provide the request to cancel a subscription to IMS session information updates to the UDM 120 (e.g., via the communication interface Ny between the IMS-AS 135 and the UDM 120), and the UDM 120 may receive the request to cancel a subscription to IMS session information updates. The request to cancel a subscription to IMS session information updates may indicate that the UDM 120 is to cease monitoring for updates to the IMS session information. Accordingly, the UDM 120 may cease monitoring, based on the request to cancel a subscription to IMS session information updates, the UDR for changes to the IMS service information. In this way, the UDM 120 is prevented from sending additional updated subscriber information to the IMS-AS 135.

In another example, the IMS-AS 135 may identify a change to one or more parameters of the IMS service information. For example, based on causing the IMS service to be provided to the user device, the IMS-AS 135 may determine that a location associated with the user device 105 and/or a location associated with the IMS service has changed. Accordingly, the IMS-AS 135 may provide information indicating the change to the one or more parameters of the IMS service information (e.g., via the communication interface Ny between the IMS-AS 135 and the UDM 120), and the UDM 120 may receive the information indicating the change to the one or more parameters of the IMS service information. The UDM 120 may update, based on the information indicating the change to the one or more parameters of the IMS service information, the IMS service information in the UDR.

As further shown in FIG. 1E, and by reference number 185, the IMS-AS 135 may cause modification of one or more parameters associated with providing the IMS service to the user device 105. For example, the IMS-AS 135 may determine, based on the updated subscriber information, the additional updated subscriber information, and/or the information indicating the change to the one or more parameters of the IMS service information (as described in the examples above), that the one or more parameters associated with providing the IMS service to the user device 105 need to be modified. Accordingly, the IMS-AS 135 may cause modification of the one or more parameters associated with providing the IMS service to the user device 105.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
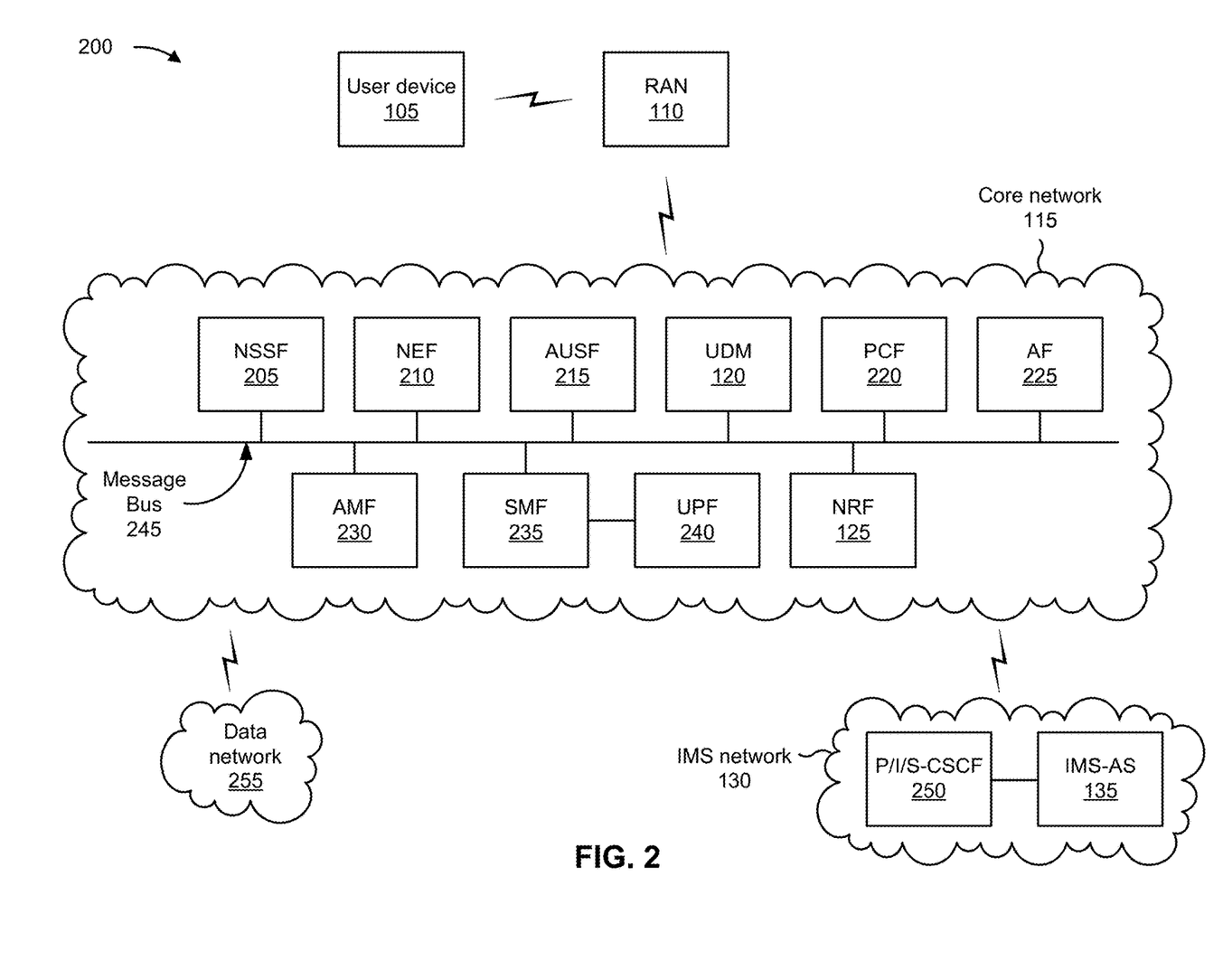
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, the IMS network 130, and a data network 255. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, the UDM 120, a policy control function (PCF) 220, an application function (AF) 225, an access and mobility management function (AMF) 230, a session management function (SMF) 235, a user plane function (UPF) 240, and the NRF 125. These functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the user device 105 in the wireless telecommunications system.

The UDM 120 includes one or more devices that store user data and profiles in the wireless telecommunications system. The UDM 120 may receive, generate, store, process, and/or provide information, such as IMS service information described herein. The UDM 120 may be used for fixed access and/or mobile access in the core network 115.

The PCF 220 includes one or more devices that provide a policy framework that incorporates network slicing, roaming, packet processing, and/or mobility management, among other examples.

The AF 225 includes one or more devices that support application influence on traffic routing, access to the NEF 210, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane quality of service (QoS), among other examples.

The NRF 125 includes one or more devices that provide a single record of all network functions available in the core network 115, together with a profile of each network function and services supported by each network function. The NRF 125 may allow other network functions to subscribe to, and get notified about, registration in the NRF 125 of new network function instances. In addition to maintaining profiles, the NRF 125 also supports service discovery functions, enabling other network functions to obtain information regarding available network functions that can support specific services.

The message bus 245 represents a communication structure for communication among the functional elements. In other words, the message bus 245 may permit communication between two or more functional elements.

The IMS network 130 may include various types of IMS network architectures associated with providing IMS services, such as media streaming, voice over IP (VoIP), rich communication services (RCS), and/or the like. The IMS network 130 may include an IMS core of a plurality of functional elements (e.g., that includes the IMS-AS 135, a P/I/S-CSCF 250, a telephony application server (TAS), a multimedia resource function control (MRFC), a short message service function (SMSF), and/or a secondary cell group (SCG)). In some implementations, The IMS network 130 can be implemented on physical devices, such as a gateway, a mobility management entity, and/or the like. In some implementations, the hardware and/or software implementing the IMS network 130 can be virtualized (e.g., through use of network function virtualization and/or software-defined networking), thereby allowing for the use of composable infrastructure when implementing the IMS network 130. In this way, networking, storage, and compute resources can be allocated to implement the functions of the IMS network 130 in a flexible manner as opposed to relying on dedicated hardware and software to implement these functions.

The IMS-AS 135 includes one or more devices capable of receiving, generating, storing, processing, providing, and/or routing information associated with an IMS service, as described elsewhere herein. The IMS-AS 135 may include a communication device and/or a computing device. For example, the IMS-AS 135 may include a server, such as an application server, a client server, a web server, a database server, a host server, a proxy server, a virtual server (e.g., executing on computing hardware), or a server in a cloud computing system. In some implementations, the IMS-AS 135 includes computing hardware used in a cloud computing environment.

The P/I/S-CSCF 250 includes one or more devices that manage all signaling from an end user to services and other networks. The P/I/S-CSCF 250 may control both fixed and mobile IMSs, may allocate application servers, may establish emergency connections, and may control communication with other networks. The P/I/S/-CSCF 250 may include a proxy-CSCF (P-CSCF), an interrogating-CSCF (I-CSCF), and a serving-CSCF (S-CSCF).

The data network 255 includes one or more wired and/or wireless data networks. For example, the data network 255 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
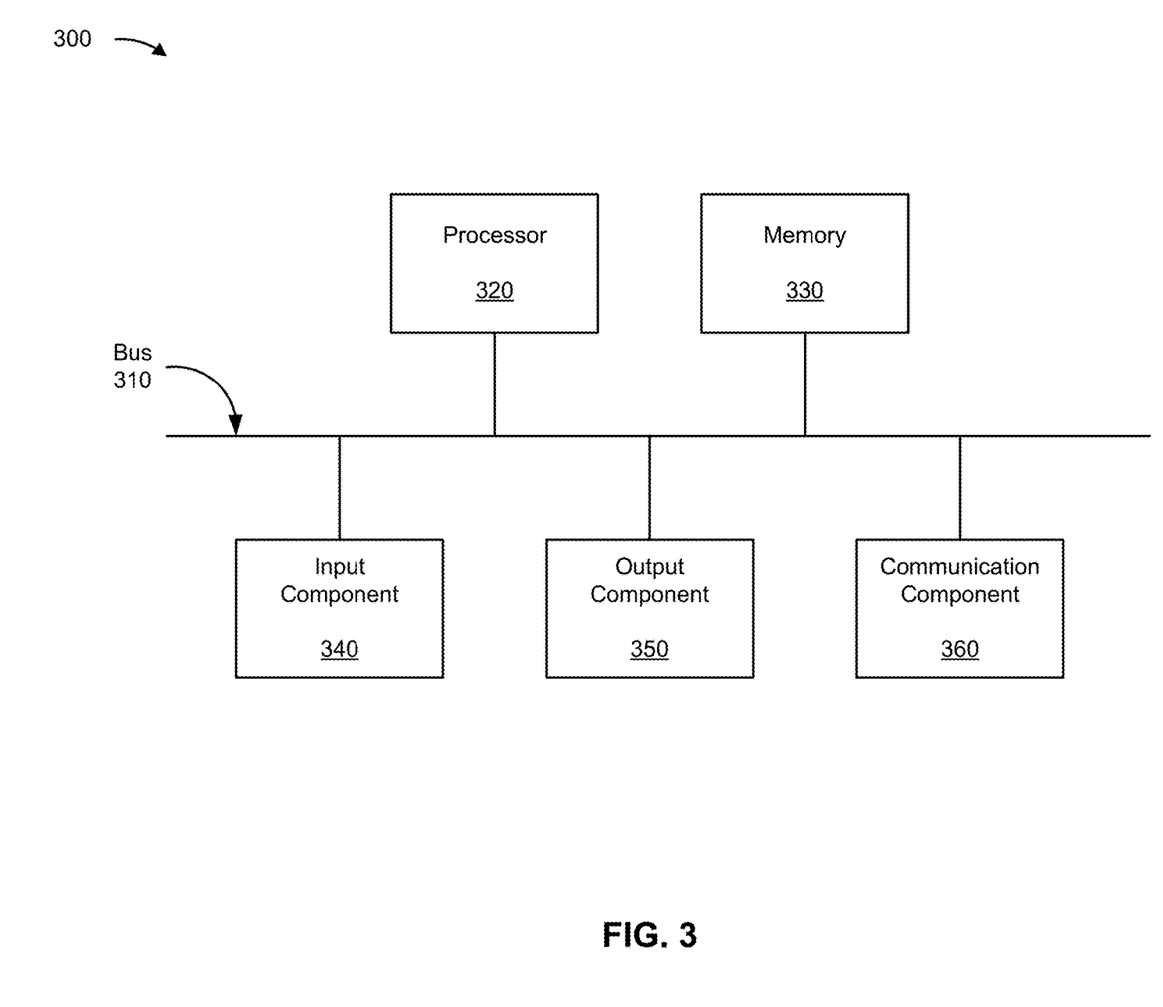
FIG. 3 is a diagram of example components of one or more devices of FIG. 2.

FIG. 3 is a diagram of example components of a device 300, which may correspond to the user device 105, the RAN 110, the UDM 120, the NSSF 205, the NEF 210, the AUSF 215, the PCF 220, the AF 225, the AMF 230, the SMF 235, the UPF 240, the NRF 125, the P/I/S-CSCF 250, and/or the IMS-AS 135. In some implementations, the user device 105, the RAN 110, the UDM 120, the NSSF 205, the NEF 210, the AUSF 215, the PCF 220, the AF 225, the AMF 230, the SMF 235, the UPF 240, the NRF 125, the P/I/S-CSCF 250, and/or the IMS-AS 135 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
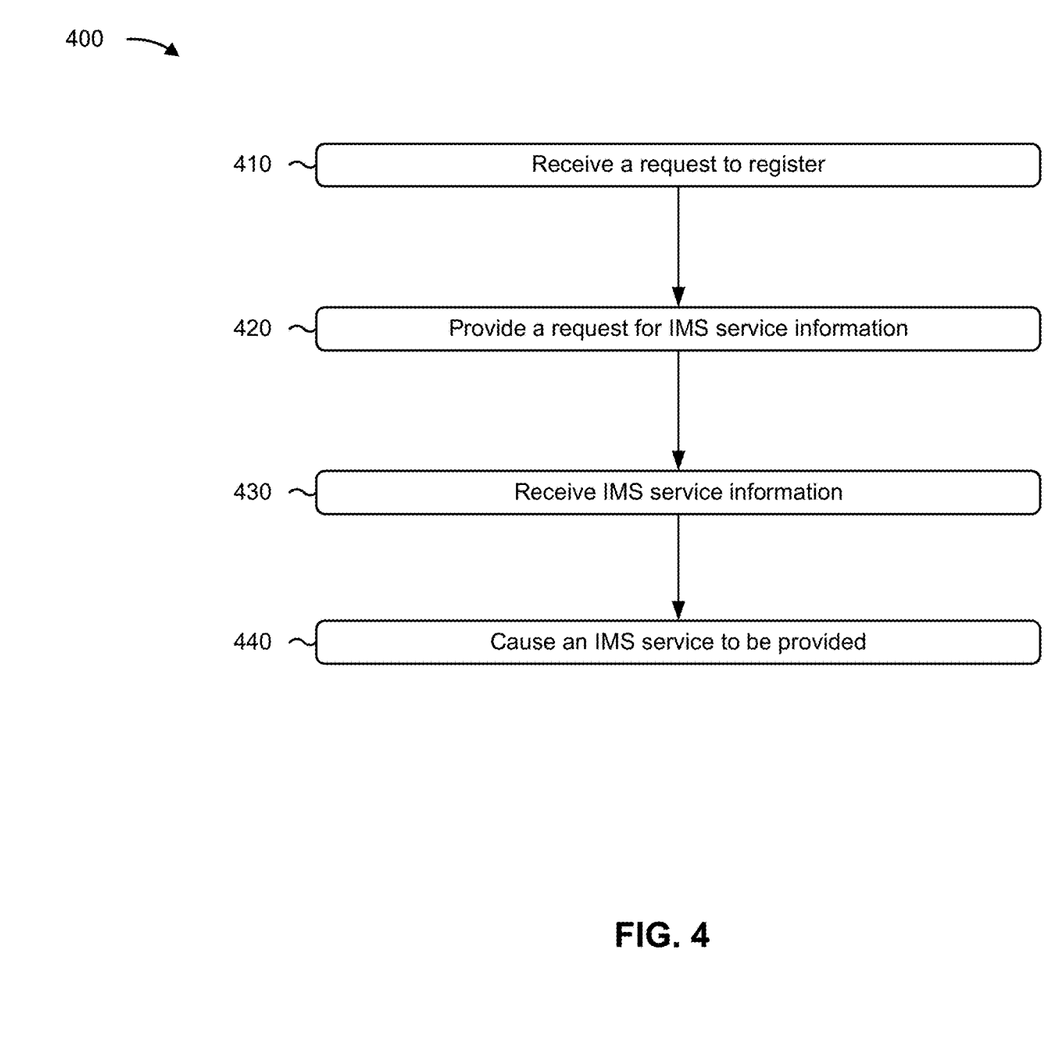
FIG. 4 is a flowchart of an example process relating to facilitating provisioning of IMS services.

FIG. 4 is a flowchart of an example process 400 for facilitating provisioning of IMS services. In some implementations, one or more process blocks of FIG. 4 may be performed by a network device (e.g., the IMS-AS 135). In some implementations, one or more process blocks of FIG. 4 may be performed by another device or a group of devices separate from or including the network device, such as UDM (e.g., the UDM 120), an NRF (e.g., the NRF 125), a CSCF (e.g., the P/I/S-CSCF 250), and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a request to register (block 410). For example, the network device may receive via a first communication interface, from a call session control function (CSCF) device, a request to register for an Internet protocol multimedia subsystem (IMS) service, as described above. In some implementations, the request to register includes registration information that comprises at least one of an international mobile subscriber identity of the user device, a mobile station international subscriber directory number of the user device, an international mobile equipment identity of the user device, a subscription permanent identifier of the user device, a generic public subscription identifier of the user device, or a permanent equipment identifier of the user device.

As further shown in FIG. 4, process 400 may include providing a request for IMS service information (block 420). For example, the network device may provide via a second communication interface between the network device and a unified data management (UDM) device, and to the UDM device, a request for IMS service information associated with the IMS service, as described above. The second communication interface may include a service-based interface between the network device and the UDM device.

As further shown in FIG. 4, process 400 may include receiving IMS service information (block 430). For example, the network device may receive based on providing the request for IMS service information, via the second communication interface, and from the UDM device, IMS service information, as described above. In some implementations, the IMS service information comprises at least one of data associated with the IMS service, location data associated with the IMS service, data associated with the IMS service, or profile data associated with the IMS service.

As further shown in FIG. 4, process 400 may include causing an IMS service to be provided (block 440). For example, the network device may cause, based on the IMS service information, the IMS service to be provided to a user device associated with the request to register for the IMS service, as described above. The IMS service may include at least one of: an IMS voice service, an IMS video service, or an IMS messaging service.

In some implementations, process 400 includes communicating, based on causing the IMS service to be provided to the user device, via the second communication interface, and with the UDM device, one or more messages related to the IMS service information. For example, process 400 includes providing, based on causing the IMS service to be provided to the user device, via the second communication interface, and to the UDM device, a request to subscribe to IMS service information updates, receiving, based on sending the request to subscribe to IMS service information updates, via the second communication interface, and from the UDM device, updated IMS service information, and causing, based on the updated IMS service information, modification of one or more parameters associated with providing the IMS service to the user device.

As another example, process 400 includes providing, after receiving the updated IMS service information, via the second communication interface, and to the UDM device, a request to modify a subscription to IMS service information updates, receiving, based on sending the request to modify a subscription to IMS service information updates, via the second communication interface, and from the UDM device, additional updated IMS service information, and causing, based on the additional updated IMS service information, additional modification of the one or more parameters associated with providing the IMS service to user device.

In an additional example, process 400 includes sending, after receiving the updated IMS service information, via the second communication interface, and to the UDM device, a request to cancel a subscription to IMS service information updates, wherein sending the request to cancel a subscription to IMS service information updates is to prevent the UDM device from sending additional updated subscriber information to the network device. In another example, process 400 includes identifying, based on causing the IMS service to be provided to the user device, a change to one or more parameters of the IMS service information, and sending, via the second communication interface, and to the UDM device, information indicating the change.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, via a first communication interface, from a device, a request to register for an Internet protocol multimedia subsystem (IMS) service;
   providing, by the network device, via a second communication interface between the network device and a unified data management (UDM) device, and to the UDM device, a request for IMS service information associated with the IMS service;
   receiving, by the network device, based on providing the request for IMS service information, via the second communication interface, and from the UDM device, IMS service information; and
   causing, by the network device and based on the IMS service information, the IMS service to be provided to a user device associated with the request to register for the IMS service.

2. The method of claim 1, wherein the request to register includes registration information that comprises at least one of:
   a subscription permanent identifier of the user device,
   a generic public subscription identifier of the user device, or
   a permanent equipment identifier.

3. The method of claim 1, wherein the IMS service information comprises at least one of:
   registration data associated with the IMS service.
   location data associated with the IMS service,
   authentication data associated with the IMS service, or
   subscriber profile data associated with the IMS service.

4. The method of claim 1, further comprising:
   providing, based on causing the IMS service to be provided to the user device, via the second communication interface, and to the UDM device, a request to subscribe to IMS service information updates;
   receiving, based on sending the request to subscribe to EMS service information updates, via the second communication interface, and from the UDM device, updated IMS service information; and
   causing, based on the updated IMS service information, modification of one or more parameters associated with providing the IMS service to the user device.

5. The method of claim 4, further comprising:
   providing, after receiving the updated IMS service information, via the second communication interface, and to the UDM device, a request to modify a subscription to IMS service information updates;
   receiving, based on sending the request to modify the subscription to the IMS service information updates, via the second communication interface, and from the UDM device, additional updated IMS service information; and
   causing, based on the additional updated IMS service information, additional modification of the one or more parameters associated with providing the IMS service to the user device.

6. The method of claim 4, further comprising:
   sending, after receiving the updated IMS service information, via the second communication interface, and to the UDM device, a request to cancel a subscription to IMS service information updates,
      wherein sending the request to cancel the subscription to the IMS service information updates is to prevent the UDM device from sending additional updated subscriber information to the network device.

7. The method of claim 1, further comprising:
   identifying, based on causing the IMS service to be provided to the user device, a change to one or more parameters of the IMS service information; and
   sending, via the second communication interface, and to the UDM device, information indicating the change.

8. A non-transitory computer-readable medium storing a set of instructions, the set of instructions comprising:
   one or more instructions that, when executed by one or more processors of a network device, cause the network device to:
      provide, via a communication interface that directly connects the network device and a unified data management (UDM) device and to the UDM device, a request for IMS service information associated with an Internet protocol multimedia subsystem (IMS) service;
      receive, via the communication interface and from the UDM device, IMS service information; and cause, based on the IMS service information, the IMS service to be provided to a user device.

9. The non-transitory computer-readable medium of claim 8, wherein the communication interface includes a service-based interface between the network device and the UDM device.

10. The non-transitory computer-readable medium of claim 8, wherein the network device is an IMS application server (IMS-AS) device.

11. The non-transitory computer-readable medium of claim 8, wherein the IMS service information is utilized to facilitate provisioning of the IMS service to the user device.

12. The non-transitory computer-readable medium of claim 8, wherein the UDM device is associated with a unified data repository (UDR) device that stores the IMS service information,
wherein the UDM device retrieves the IMS service information from the UDR device to provide the IMS service information to the network device.

13. The non-transitory computer-readable medium of claim 8, wherein the network device provides the request for IMS service information based on receiving, via another communication interface, and from a call session control function (CSCF) device, a request to register for the IMS service.

14. The non-transitory computer-readable medium of claim 8, wherein the one or more instructions further cause the network device to:
communicate, based on causing the IMS service to be provided to the user device, via the communication interface, and with the UDM device, one or more messages related to the IMS service information.

15. A network device, comprising:
one or more processors configured to:
provide, via a communication interface and to a unified data management (UDM) device, a request for IMS service information associated with an Internet protocol multimedia subsystem (IMS) service;
receive, via the communication interface and from the UDM device, IMS service information; and
cause, based on the IMS service information, the IMS service to be provided to a user device.

16. The network device of claim 15, wherein the communication interface includes a service-based interface between the network device and the UDM device.

17. The network device of claim 15, wherein the network device is an IMS application server (IMS-AS) device.

18. The network device of claim 15, wherein the IMS service includes at least one of:
an IMS voice service,
an IMS video service, or
an IMS messaging service.

19. The network device of claim 15, wherein the network device provides the request for IMS service information based on receiving a request to register for the IMS service.

20. The network device of claim 15, wherein the one or more processors are further configured to:
communicate, based on causing the IMS service to be provided to the user device, via the communication interface, and with the UDM device, one or more messages related to the IMS service information.

\* \* \* \* \*